US006102250A

United States Patent [19]

Leo, Sr.

[11] Patent Number: 6,102,250

[45] Date of Patent: Aug. 15, 2000

[54] LEVER OPERATED DEVICE FOR DISPENSING CARDS

[76] Inventor: Daniel W. Leo, Sr., 300 E. 40th St., 32B, New York, N.Y. 10016

[21] Appl. No.: 08/969,765

[22] Filed: Nov. 13, 1997

[51] Int. Cl.[7] .................................................. B65G 59/00

[52] U.S. Cl. ........................................ 221/259; 221/231

[58] Field of Search ................................ 221/231, 255, 221/277; 271/149

[56] References Cited

U.S. PATENT DOCUMENTS

| | | | |
|---|---|---|---|
| 333,073 | 12/1885 | Hoyt | 221/231 X |
| 945,178 | 1/1910 | Levin | 221/231 |
| 2,396,411 | 3/1946 | Cameron | 221/231 |
| 2,926,814 | 1/1960 | Utiger | 221/213 |
| 3,154,216 | 10/1964 | Snow et al. | 221/231 |
| 4,039,181 | 8/1977 | Prewer | 271/10 |
| 4,473,172 | 9/1984 | Reynolds | 221/231 X |
| 5,197,589 | 3/1993 | Gordon | 194/248 |
| 5,400,919 | 3/1995 | Gomm et al. | 221/195 |

*Primary Examiner*—William E. Terrell
*Assistant Examiner*—Gene O. Crawford
*Attorney, Agent, or Firm*—Charles E. Temko

[57] ABSTRACT

A device for storing and serially dispensing cards, typically those impregnated with a perfumed scent for sampling by a perspective customer. The device stores a number of cards arranged in a substantially vertical stack. The cards are moved to a dispensing point by a spring loaded carriage into a dispensing mechanism which serially removes a leading card from the stack, changes its position to horizontal and ejects it through an opening in the front of the device as a lever is manually depressed.

2 Claims, 7 Drawing Sheets

FIG. 2
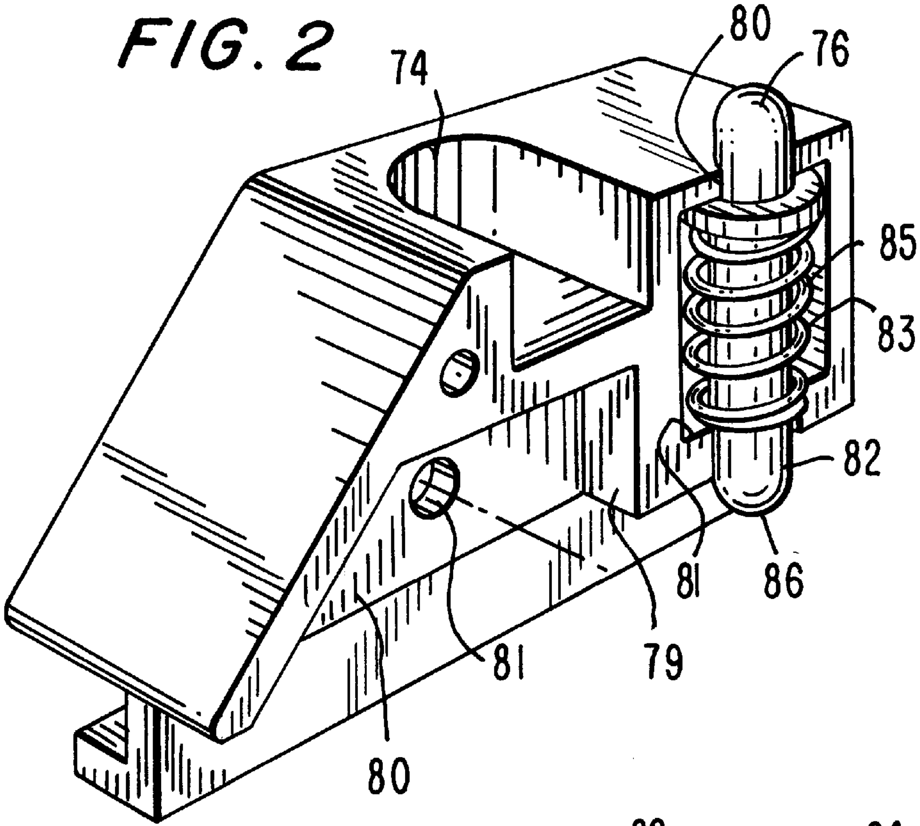
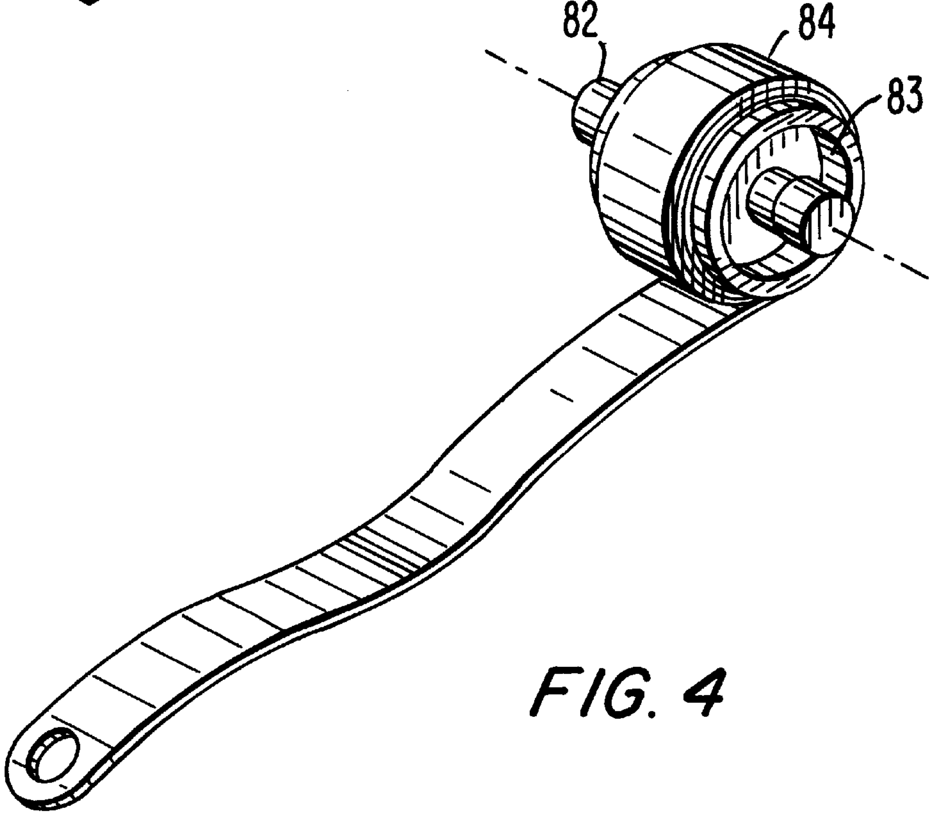
FIG. 4

FIG. 7
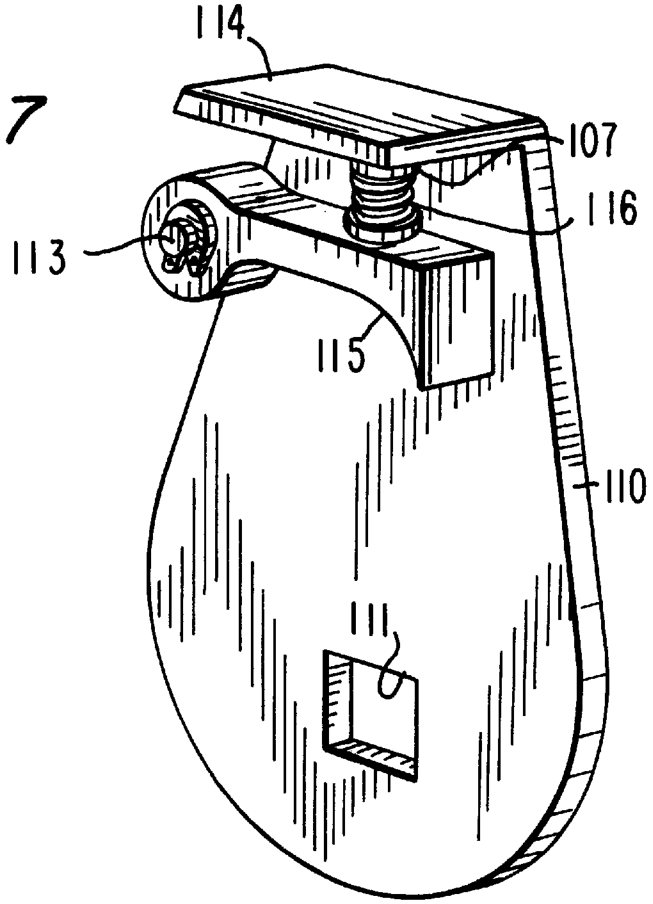
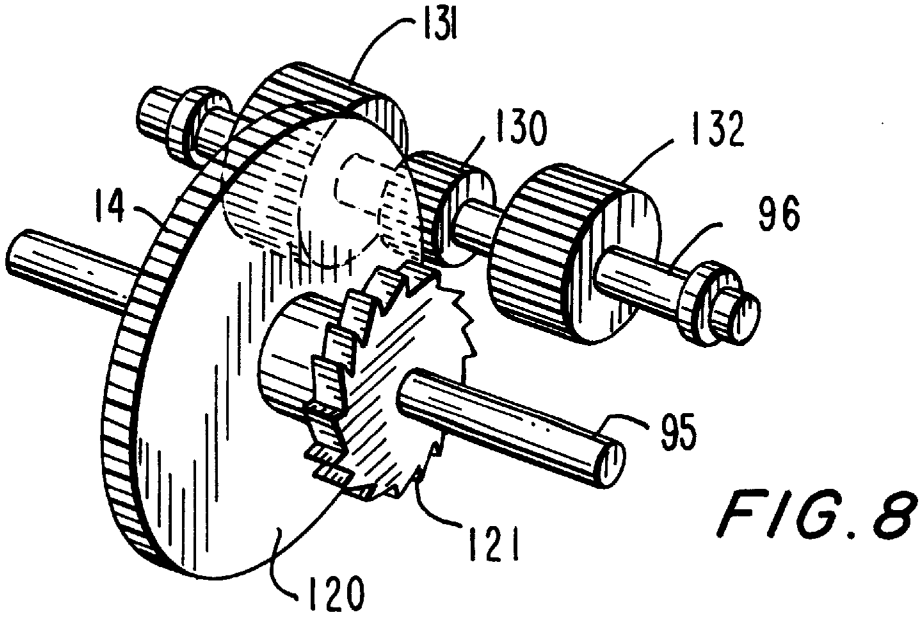
FIG. 8

FIG. 9
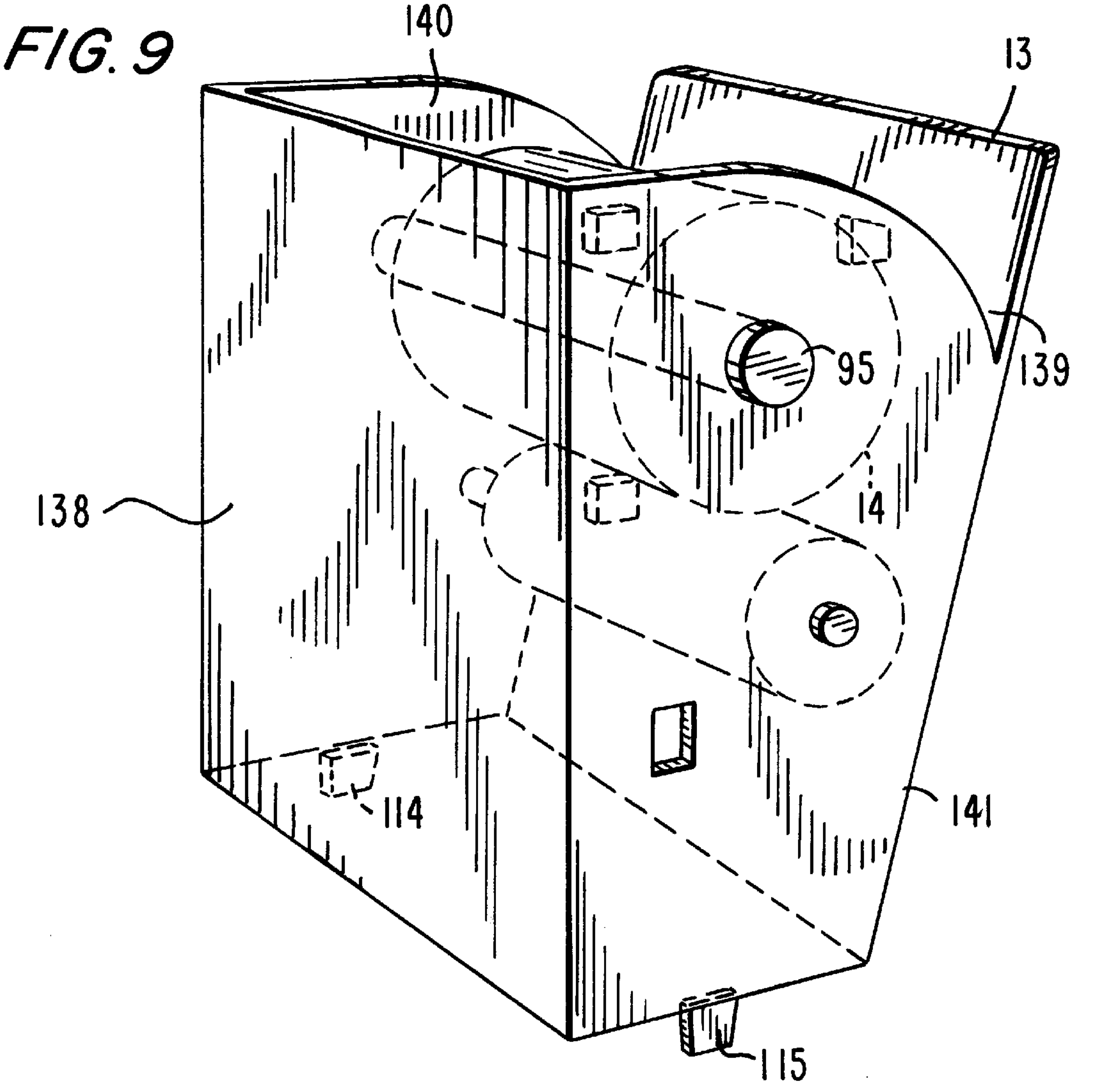
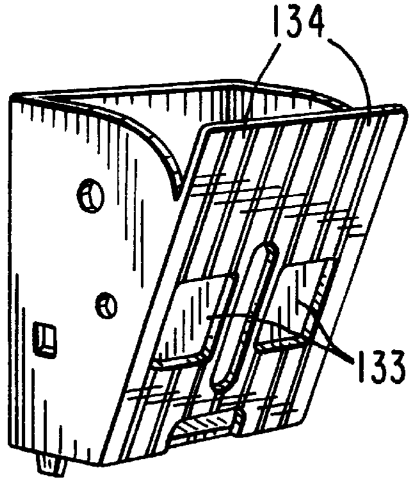
FIG. 10

LEVER OPERATED DEVICE FOR DISPENSING CARDS

BACKGROUND OF THE INVENTION

This invention relates generally to the field of dispensing devices for substantially flat card-like articles of relatively small dimension, typically, impregnated paper cards carrying the scent of a particular perfume or toilet water which may be sampled at the display counter of a store. Devices of this general type are known in the art, and the invention lies in specific constructional details which provide improved facility in operation while minimizing wastage.

In many prior art devices of this type, both construction and operation are relatively simple. The cards are positioned in a substantially vertical stack within a container, with a dispensing opening adjacent a bottom wall for the insertion of a finger to frictionally engage a lower surface of the bottom card in the stack and move it through the opening. The cards are fed under the action of gravity, or in some cases, a lid is provided on its lower surface with resilient means to urge the stack downwardly.

While such structures are suitable for dispensing such articles as ordinary business cards, or individual cards used in playing a board game or the like, such articles as perfume impregnated cards are relatively expensive to manufacture, and simple dispensers lend themselves to multiple extraction by customers who might prefer to obtain a small assortment of perfumes without actual purchase. When this occurs, the dispensing device is quickly emptied, and if not relatively promptly refilled, its primary function is disabled.

It is known in the art to provide for the dispensing of individual towels from a roll or web of material in which the user is required to perform a manual operation in order to cause a length of the towel to protrude from the dispenser where it can be manually grasped prior to tearing the same from the web. In some cases, a time delay mechanism forms part of the mechanism, so that only one piece of tiling may be retracted over a short period of time. Such devices are suitable where the dispenser is permanently mounted upon a wall or other surface, and may require a source of electric power for operation. By contrast, countertop devices are best wholly contained to facilitate portability and relocation upon a countertop.

SUMMARY OF THE INVENTION

Briefly stated, the invention contemplates the provision of an improved device of the class described which is reasonably compact in overall configuration while having the capability of storing a relatively large number of specialized cards for individual dispensing. Further, the device includes a dispensing mechanism which must be manually operated by the user to obtain an individual card which is subsequently located at a dispensing slot for further manual engagement and removal. This dispensing operation requires a short time period which may be further extended by a timing mechanism, if desired, so that a potential customer would be consciously aware that she would be noticed if she continued to operate the dispensing device for more than such short period of time.

To accomplish this end, the device provides for the maintenance of undispensed cards in a substantially horizontally positioned stack in which cards are advanced from the rear of the device toward the front for dispensing. In the process of being dispensed, individual cards are serially removed from the stack by rotating friction wheels which guide the separated card from a substantially vertical plane to a substantially horizontal plane for removal. The friction wheels can only be advanced in a single direction in incremental manner caused by manual actuation of a manually operated crank supported upon a side wall of the device.

BRIEF DESCRIPTION OF THE DRAWINGS

In the drawings, to which reference will be made in the specification, similar reference characters have been employed to designate corresponding parts throughout the several views.

FIG. 2 is a view in perspective of a latch element forming part of the floor plate assembly.

FIG. 4 is a fragmentary exploded view thereof.

FIG. 7 is a perspective view of a pawl plate assembly.

FIG. 8 is a fragmentary perspective view of a gear train element operated by the crank means shown in FIG. 6.

FIG. 9 is a perspective view of a chassis assembly.

FIG. 10 is a second perspective view of the chassis assembly as seen from the right-hand portion of FIG. 9.

DETAILED DESCRIPTION OF THE DISCLOSED EMBODIMENT

Figure 1:
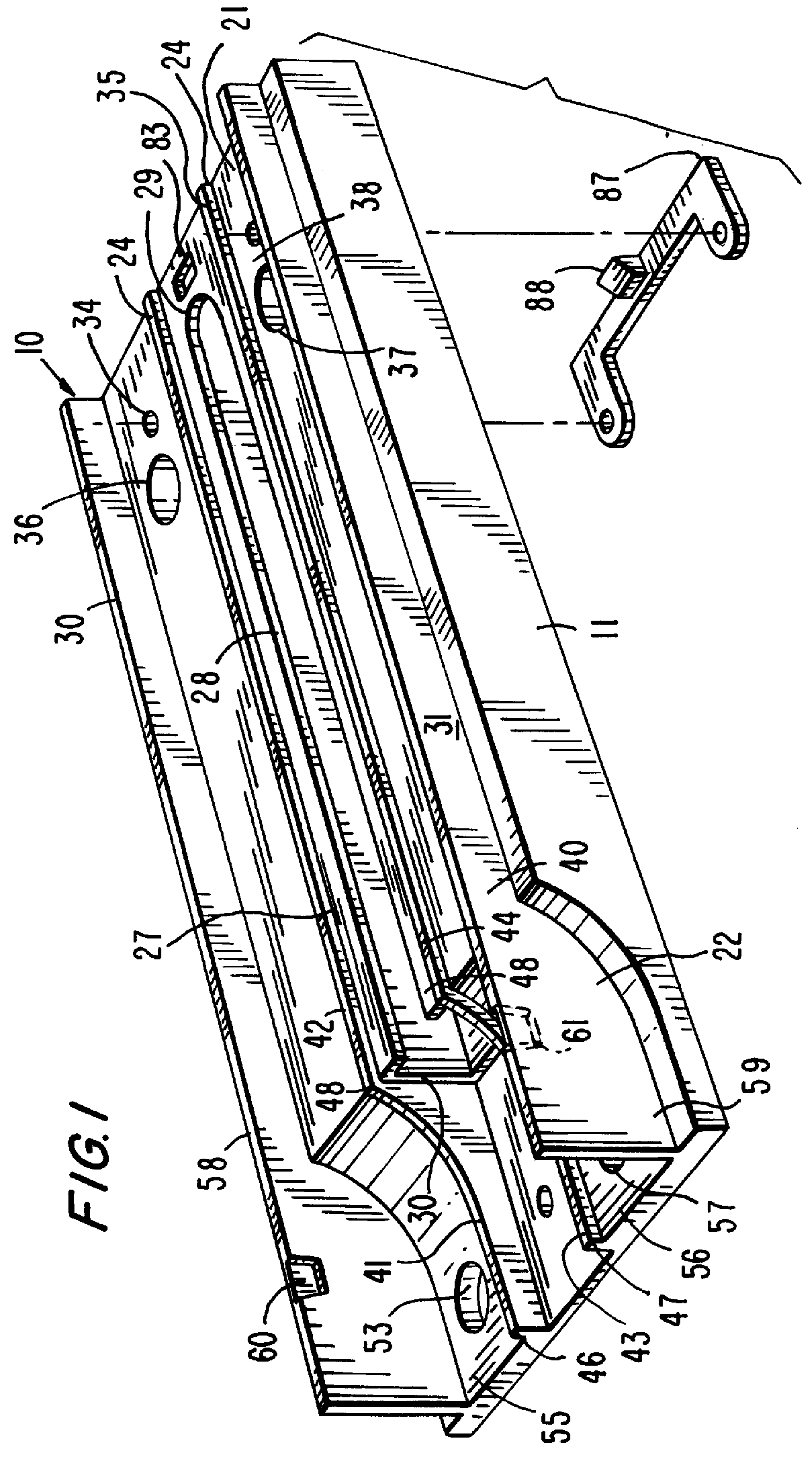
FIG. 1 is a view in perspective of a floor plate assembly comprising a part of a disclosed embodiment.
Figure 3:
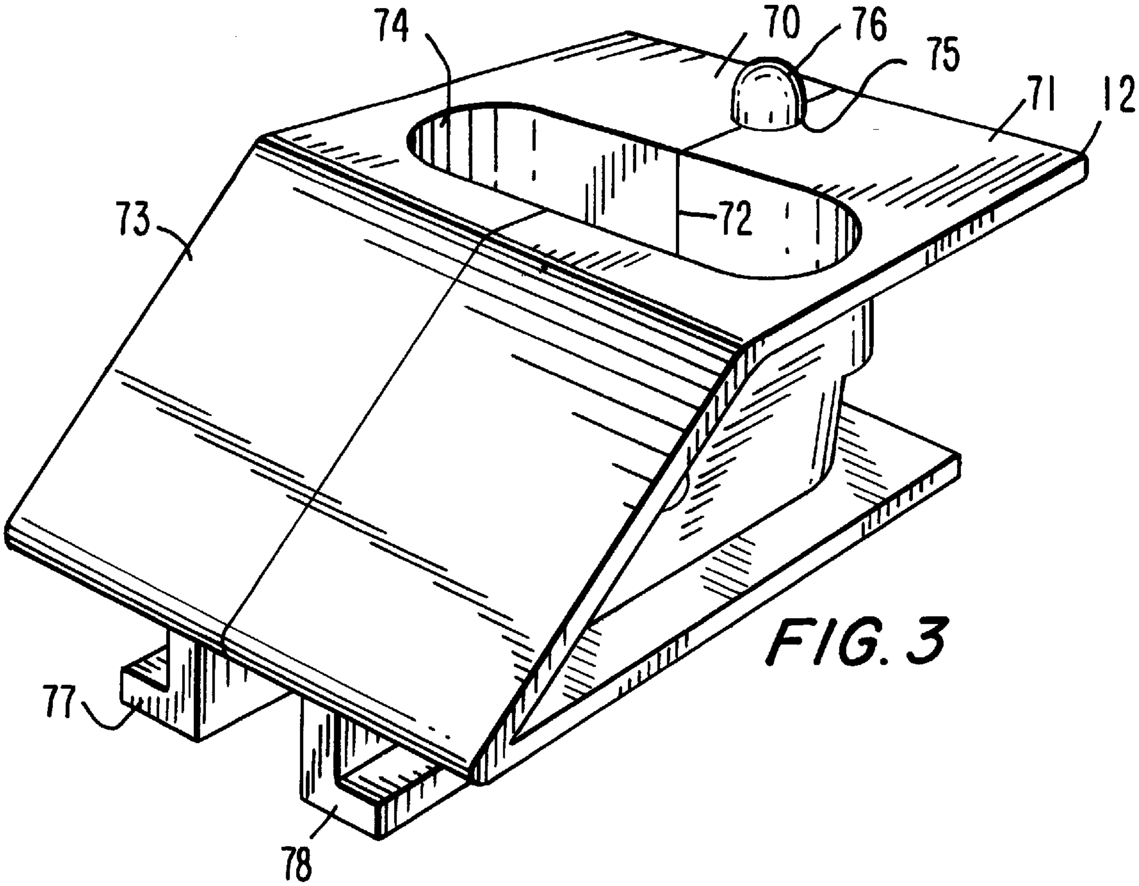
FIG. 3 is a view in perspective of a carriage element slidably mounted upon the floor plate assembly.

In accordance with the invention, the device, generally indicated by reference character 10, comprises broadly: a floorplate element 11, a carriage element 12, a chassis element 13, and a card advancement element 14.

Referring to FIG. 1, the floorplate element 11 may be most conveniently formed as a synthetic resinous molding. The upper surface thereof includes a first planar zone 21 and a curved card deflecting zone 22. A stack of dispensable cards 23 is normally supported on a plurality of friction controlled ribs 24, preferably four in number.

Referring to zone 21, a floorplate surface 27 includes a longitudinally extending slot 28 having a rear end 29 and an open front end 30. A pair of card guide ribs 30 and 31 are positioned to engage the side edges of the cards and maintain the stack in alignment. A tab aperture 33 accommodates a carriage element latching means (FIG. 2). Mounting bosses 34 and 35 are provided with mounting holes 36 and 37 to enable the device to be permanently secured to a counter (not shown) or other horizontal supporting structure, if desired.

The card deflecting zone 22 commences at a transition point 40 and includes a plurality of friction ribs 41, 42, 43, and 44 terminating at points 46, 47, 48, and 49. A central flat floor 50 defines a spring anchoring aperture 51. Depressed bosses 55 and 56 define additional mounting holes 56 and 57. Card guide wall extensions 58 and 59 overlying the zone 22 are provided with mounting notches 60 and 61 for engaging the chassis element 13, as will more fully appear.

The carriage element 12 serves to resiliently urge a stack of cards toward the chassis element 13 where the outer surface of the lead card becomes engaged by the card advancement element 14. It includes first and second symmetrically shaped members 70 and 71 joined at a center line 72. An angled front surface 73 is positioned ahead of a finger pull depression 74 behind which is situated an opening 75 for a lock release button 76. A pair of angularly shaped shoes 77 and 78 provide for sliding engagement within a slot 62.

A spring recess 79 includes a pair of aligned transfer bores 80 and 81 which support the shaft 82 of a spring spool 83 having a constant force or negator spring 84. The button 76 is supported by a coil spring 85. The lower end 86 of the button engages a resilient latch member 87 (FIG. 2) including a projection 88 which projects through a rectangular opening 89 to engage the carriage element when in retracted condition.

During assembly of the device, the carriage element 12 will be assembled on the floor plate 11 prior to positioning of the chassis element 13.

Figure 12:
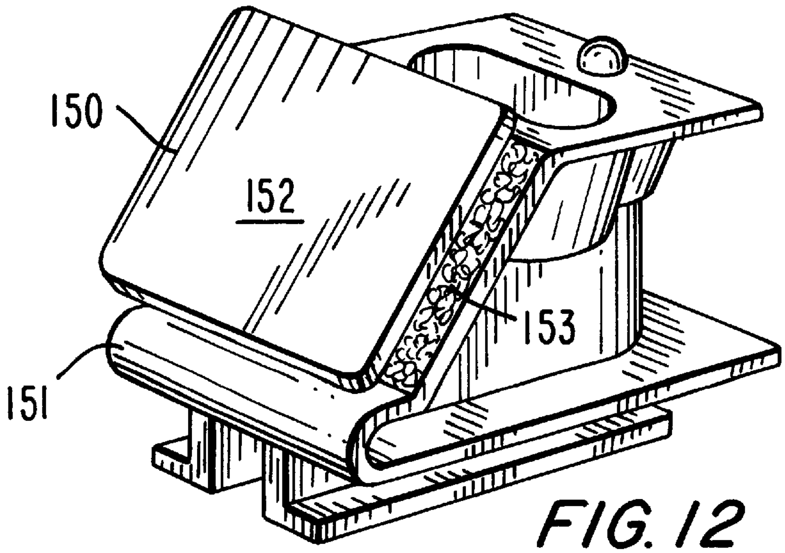
FIG. 12 is a view in perspective corresponding to that seen in FIG. 3, showing an alternate form of carriage.

The chassis element 13 is mounted upon the floor plate element 11 in the area of the card deflecting zone 22, and is best understood from a consideration of FIGS. 9 and 12 in the drawing. It substantially encloses the card advancement element 14. It is of generally rectangular configuration, including a forward wall 138, a rear wall 139, and side walls 140 and 141. Each side wall includes an engagement tab 114–115 engaging corresponding notches in the side wall extensions of the floor plate element 11 (see FIG. 11).

Figure 6:
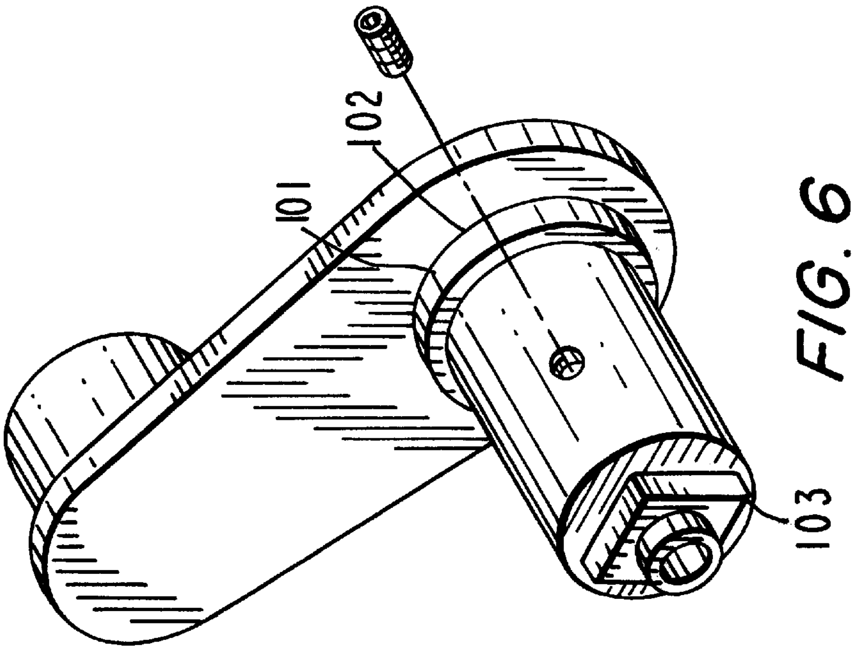
FIG. 6 is a perspective view of the crank means.
Figure 5:
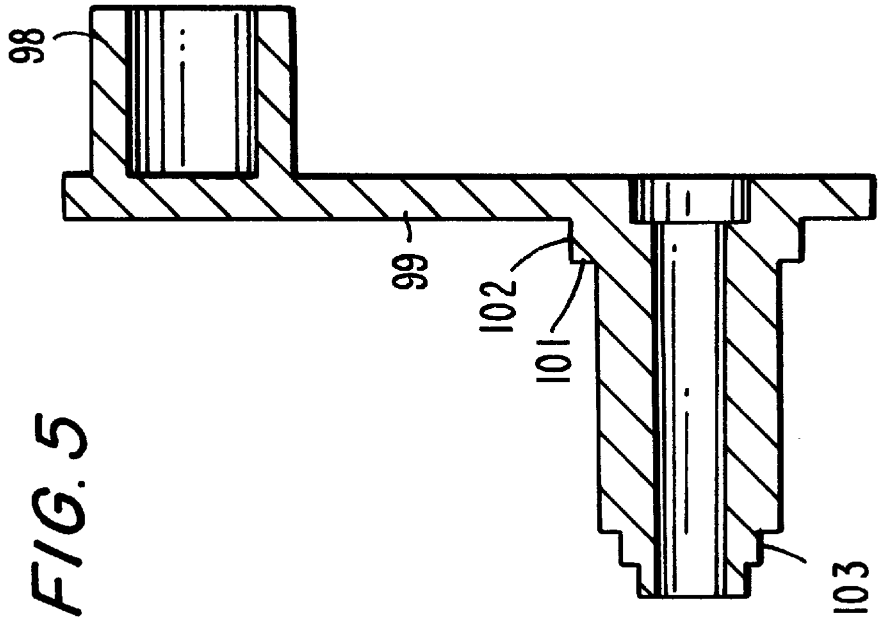
FIG. 5 is a fragmentary sectional view showing a manually operated crank means.

The card advancement element 14, as has been mentioned, is positioned within the chassis element 13. It includes a driving axle 95 and a driven axle 96. The driving axle 95 mounts a crank assembly 97 including a crank 98, a crank arm 99, and a shaft assembly 100. The assembly 100 includes a shoulder 101 which forms a bearing surface 102 for the crank as well as a non-circular portion 103 (FIGS. 5 and 6).

Referring to FIG. 7, a pawl plate 110 includes a non-circular opening 111 which engages the portion 103 and is held in position by any suitable fastening means (not shown). A set screw 107 permits adjustment of the effective length of the assembly 100 as required.

The pawl plate 110 (FIG. 7) supports a pawl axle or pintle 113 disposed beneath a flanged top 114 of the plate 110. A pawl 115 is supported on the axle 113 and urged downwardly by a small spring 116. A return spring (not shown) moves the crank to its uppermost position between stops 124 and 125 (FIG. 11), or the operation may be entirely manual in both directions, thus requiring slightly more time between discharge cycles.

Referring to FIG. 8, the driving axle 95 carries main gear 120 and ratchet wheel 121. The driven axle 96 carries a driven pinion 130 and rubber covered drive wheels 131 and 132 which project through openings 133 (FIG. 10) to engage the exposed surface of the lead card of the stack. Friction rails 134 are positioned adjacent the openings 133 (FIG. 10) and provide proper alignment of the lead card.

Figure 11:
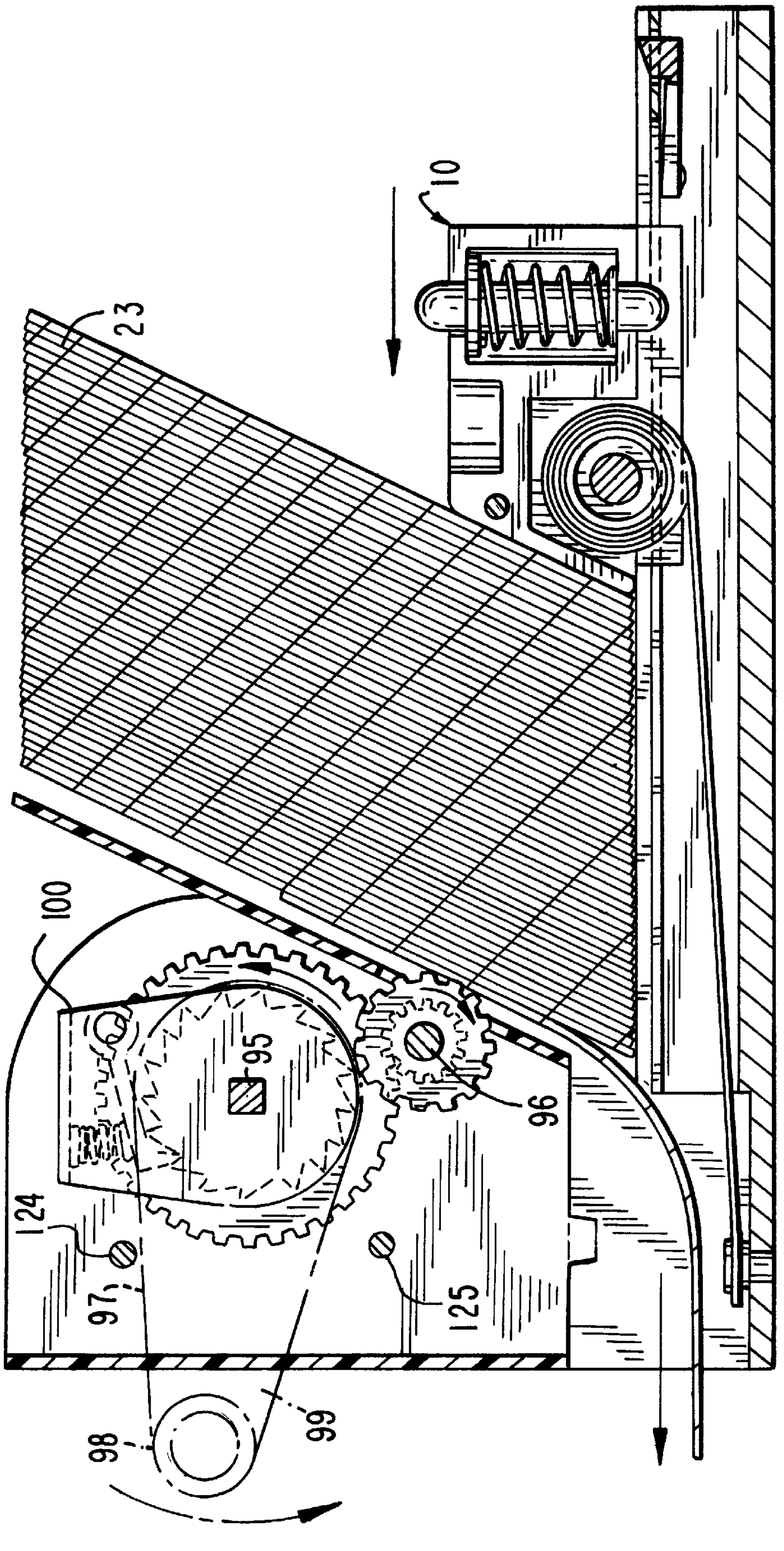
FIG. 11 is a longitudinal vertical sectional view of the embodiment in fully assembled condition.

Operation will be readily apparent from a consideration of FIG. 11. Manually applied downward pressure on the crank results in clockwise rotation of the friction wheels which serve to move the lead card in the stack downwardly to be engaged by the rails of the curved zone 22 whereby the lead or bottom edge of the card is projected outwardly for manual engagement. Manual removal of the card advances the stack so that the cycle may be repeated. As the crank is lifted and the axle 95 is rotated clockwise, the ratchet mechanism enables the wheels 131 and 132 to remain stationary. This cycle is repeated until the stack of cards is exhausted, at which time the supply may be renewed by moving the carriage element 12 rightwardly as seen in FIG. 11.

Referring to FIG. 12, when running cards with thicker samples on the rear face thereof, it may be necessary to modify the face of the carriage element. Thus, in the modification shown in FIG. 12, the carriage face 150 is provided with a lower projection 151 and a resilient plate 152 suspended on foam 153. This construction helps to maintain even pressure at the front of the stack where the leading cards meet the feed wheels. With this construction, the sponge backed plate will recede until the last one or two cards are dispensed, at which point it will supply a slight pressure to allow even the last card to be dispensed without difficulty.

In essence, the invention provides novel and inventive structure which prevents rapid removal of successive cards from a stack. Instead, the dispensing of each successive card requires a series of actions on the part of the user including the operation of the crank in both directions with a separate grasping motion necessary to remove each card from the device. An attempt to rapidly operate the device through successive cycles will normally attract the attention of a sales person who is enabled to take such steps with respect to the user as may be necessary. Normally, a mere glance will suffice to create sufficient embarrassment on the part of the user to halt such procedure.

The device is most conveniently manufactured almost entirely from synthetic resinous parts at a relatively low cost of production, and, should servicing be required, any of the component parts can normally be replaced without tools by persons possessing only ordinary skills.

I wish it to be understood that I do not consider the invention to be limited to the precise details of structure shown and set forth in the specification, for obvious modifications will occur to those skilled in the art to which the invention pertains.

I claim:

1. A lever operated device for dispensing cards, comprising: a floor plate element, a carriage element, a chassis element, and a manually operated card advancement; said floor plate element including a horizontally positioned plate having a first generally planar surface for supporting a longitudinally oriented stack of cards, and an arcuate surface communicating with said planar surface adapted to serially engage individual cards from said stack at a lower edge thereof, and guide said cards to horizontal orientation prior to discharge at one end of said floor plate element; said carriage element being mounted upon said floor plate element for sliding movement, and being resiliently urged toward said one end thereof to engage said stack of cards; said chassis element including front, rear, and a pair of side walls defining an enclosure, and overlying said floor plate element at said one end thereof, said card advancement element being mounted within said enclosure and having manually actuable means projecting outwardly of said enclosure for imparting incremental movement, said card advancement element including at least one friction wheel projecting outwardly of said enclosure driven by said manually actuable means for engaging a leading card in said stack and with a single reciprocating movement driving said card into contact with said arcuate surface completely advancing said card out of contact with said stack from a substantially vertical position to a horizontal position away from said stack for dispensing.

2. A device in accordance with claim 1, said card advancement element including a crank operated ratchet and pawl structure mounted within said chassis element.

* * * * *